Figure 9:
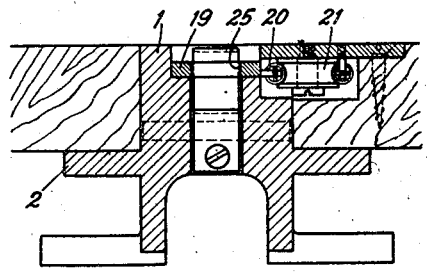

Aug. 14, 1945.　　　　G. MAURER　　　　2,382,801
ADJUSTING AND CONTROL DEVICE FOR MATERIAL WORKING MACHINES
Filed April 22, 1943　　　11 Sheets-Sheet 1

Inventor
G. Maurer
By Glaserk Downing Seebold
Attys

Aug. 14, 1945.　　　G. MAURER　　　2,382,801
ADJUSTING AND CONTROL DEVICE FOR MATERIAL WORKING MACHINES
Filed April 22, 1943　　11 Sheets-Sheet 2

Inventor
G. Maurer
By Glascock Downing & Seebold Attys.

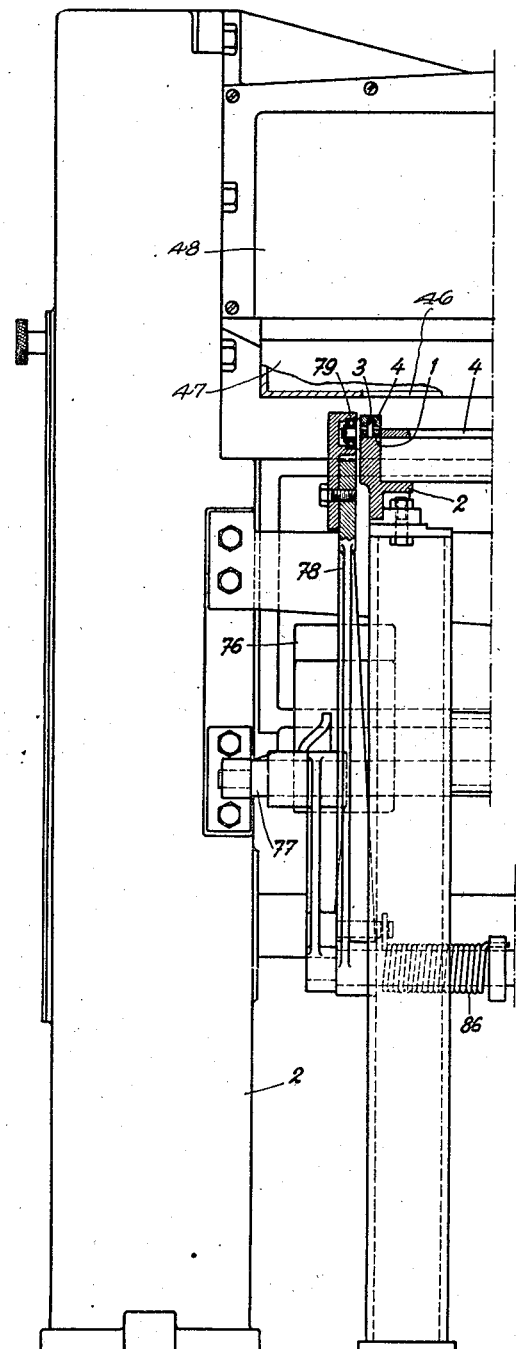

Aug. 14, 1945.  G. MAURER  2,382,801
ADJUSTING AND CONTROL DEVICE FOR MATERIAL WORKING MACHINES
Filed April 22, 1943  11 Sheets-Sheet 4

Inventor
G. Maurer
By Glascock Downing & Seibell
attys

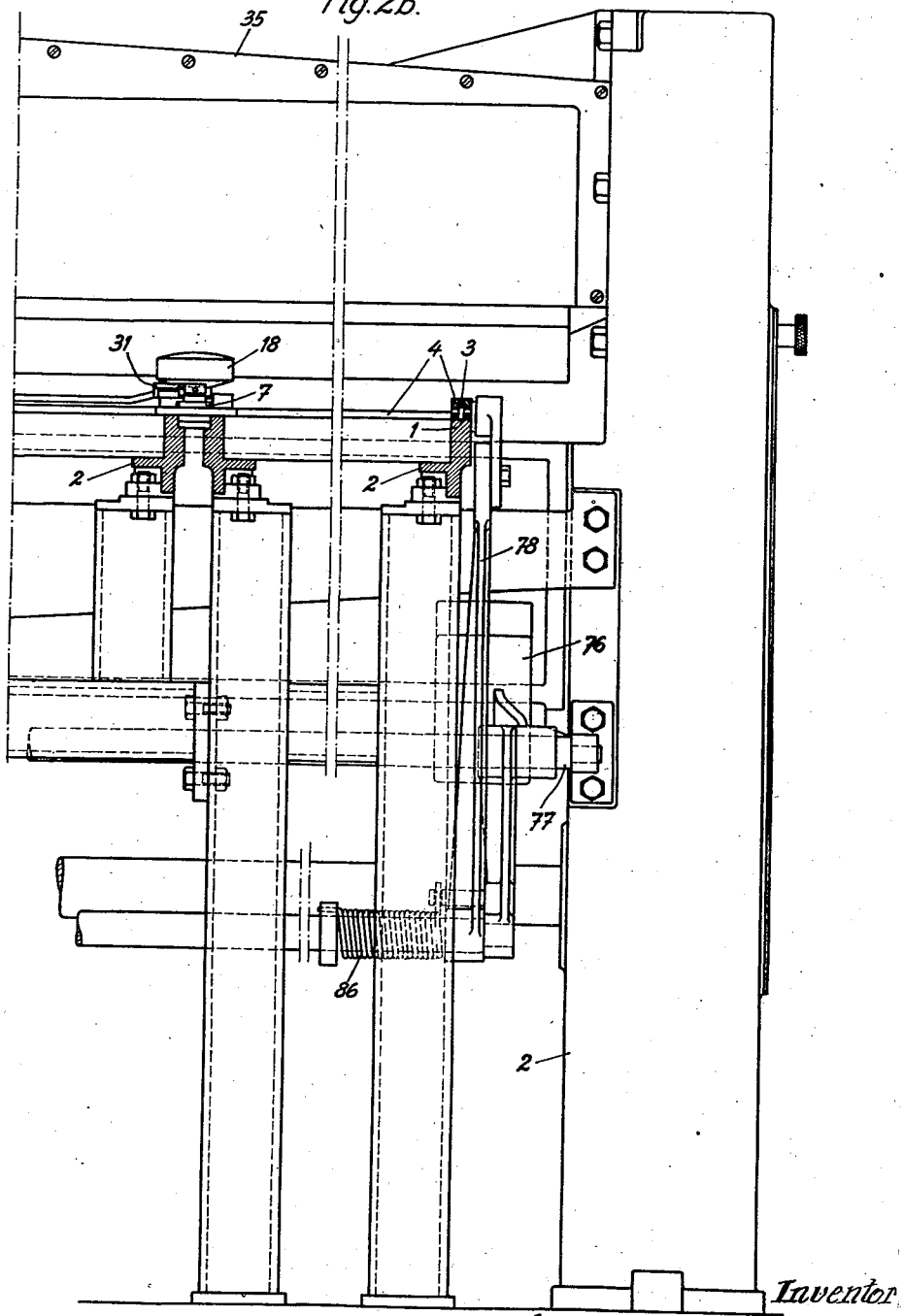

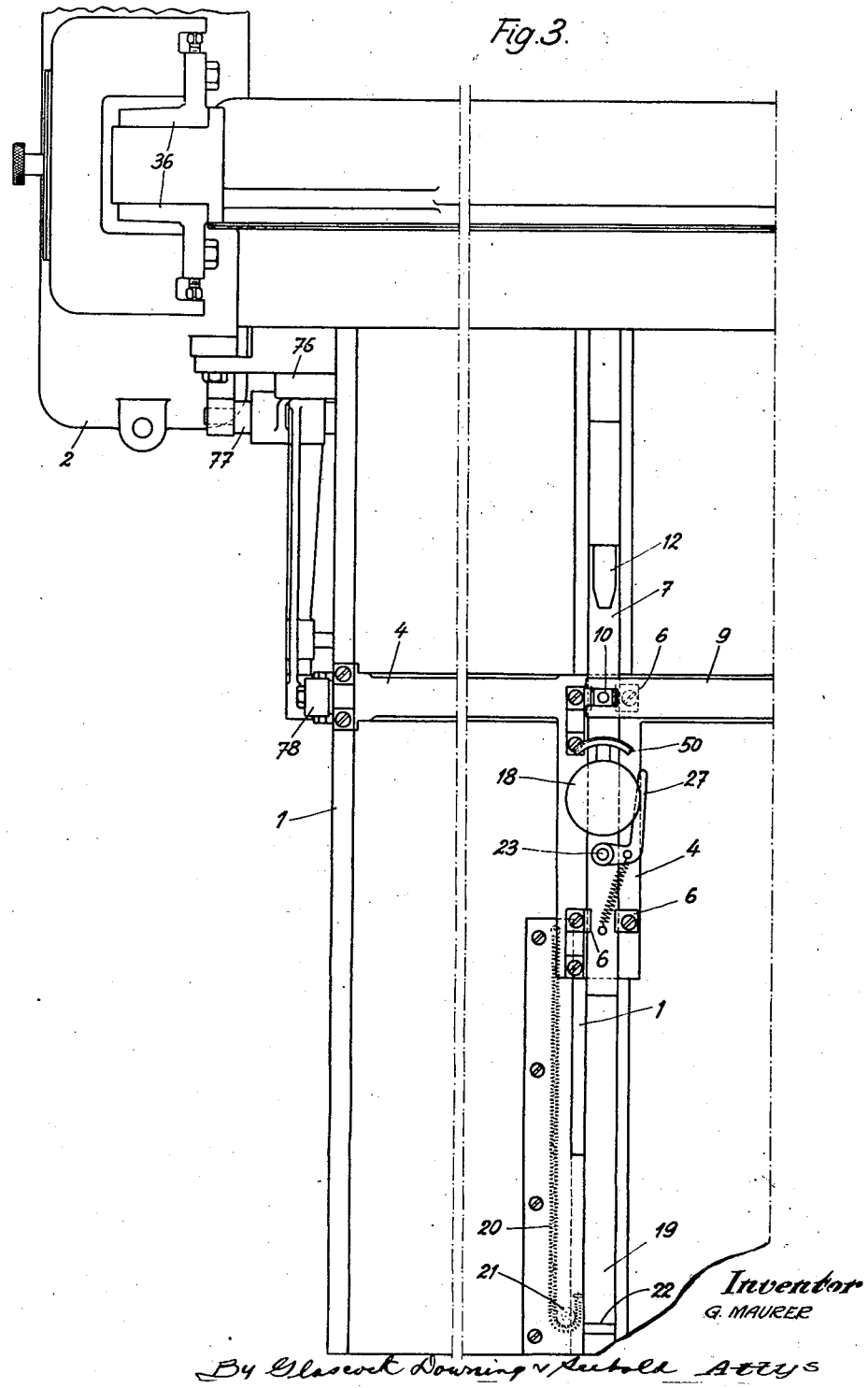

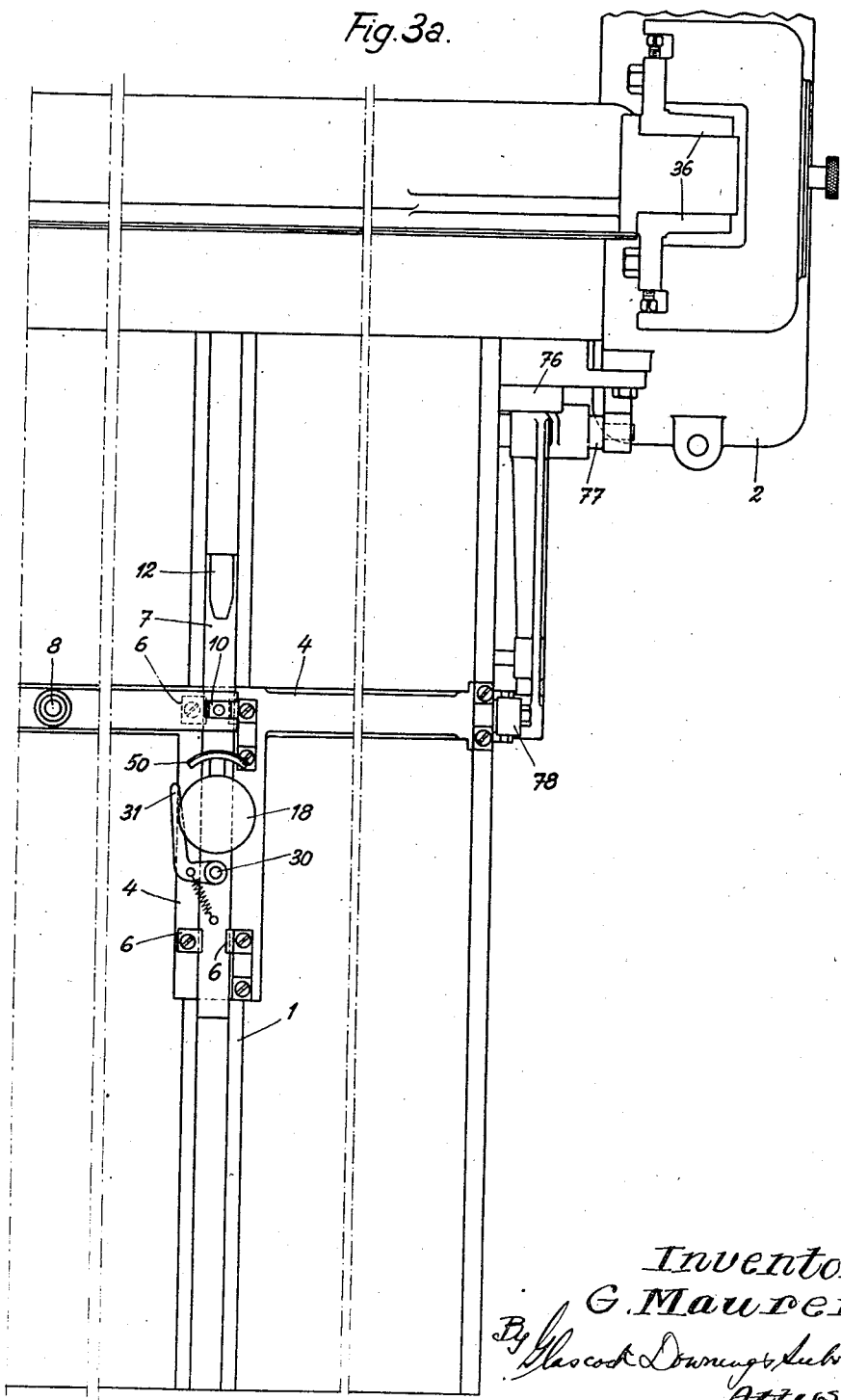

Aug. 14, 1945.   G. MAURER   2,382,801
ADJUSTING AND CONTROL DEVICE FOR MATERIAL WORKING MACHINES
Filed April 22, 1943    11 Sheets-Sheet 8

Inventor
G. Maurer
By Glascock Downing & Seebirle Attys

Aug. 14, 1945.  G. MAURER  2,382,801
ADJUSTING AND CONTROL DEVICE FOR MATERIAL WORKING MACHINES
Filed April 22, 1943  11 Sheets-Sheet 9
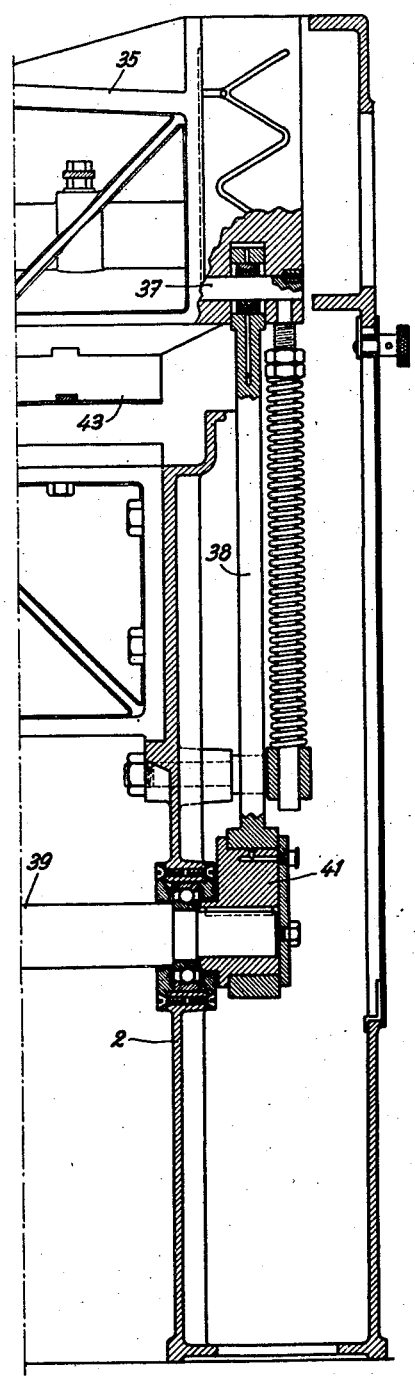
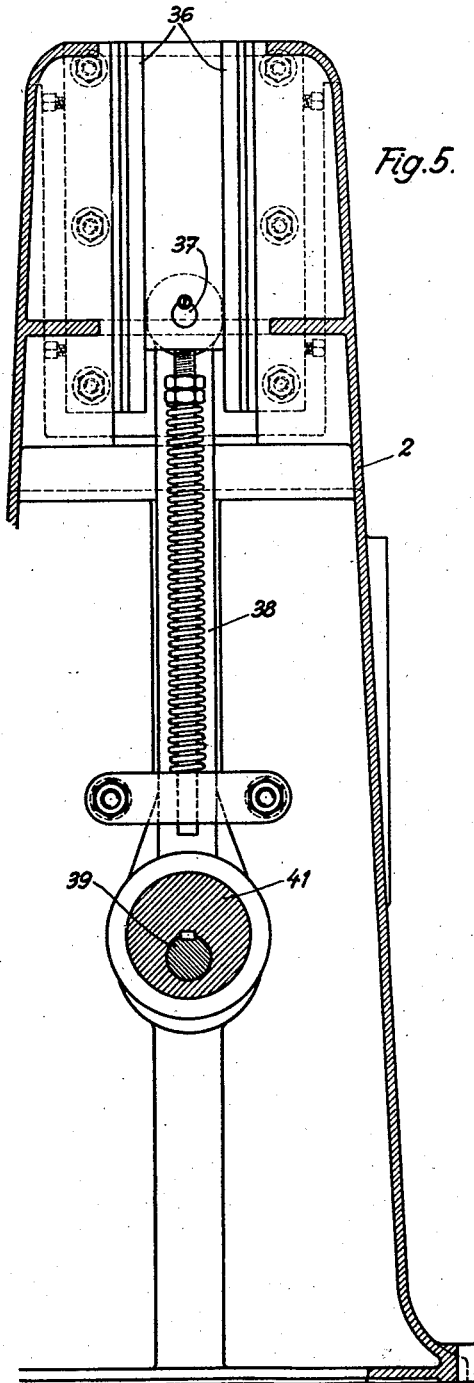

Aug. 14, 1945.   G. MAURER   2,382,801
ADJUSTING AND CONTROL DEVICE FOR MATERIAL WORKING MACHINES
Filed April 22, 1943    11 Sheets-Sheet 10
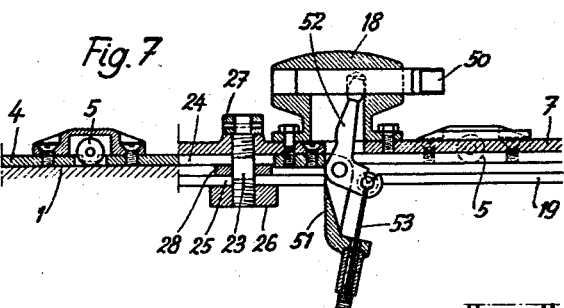
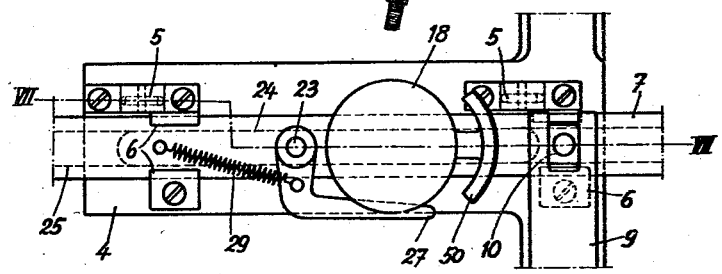
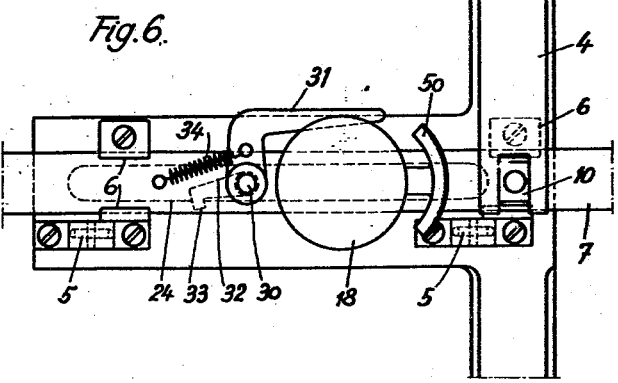
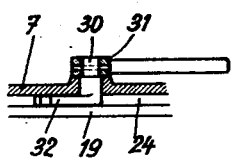
Inventor
G. Maurer
By Glascock Downing & Seebold
Attys Aug. 14, 1945.    G. MAURER    2,382,801
ADJUSTING AND CONTROL DEVICE FOR MATERIAL WORKING MACHINES
Filed April 22, 1943    11 Sheets-Sheet 11

Inventor
G. Maurer
By Stewart Downing v Sable
Attys.

Patented Aug. 14, 1945

2,382,801

UNITED STATES PATENT OFFICE 2,382,801

ADJUSTING AND CONTROL DEVICE FOR MATERIAL WORKING MACHINES

Gottfried Maurer, Zurich, Switzerland, assignor to the firm Müller A.-G. Brugg, Maschinenfabrik und Eisengiesserei Brugg, Brugg, Switzerland, a joint-stock company of Switzerland Application April 22, 1943, Serial No. 484,059
In Switzerland April 17, 1942

12 Claims. (Cl. 164—48)

The object of the present invention is to provide an adjusting and control device for wood working machines, especially but not exclusively for veneer clipping machines or for machines acting on other materials.

It is often very troublesome and dangerous to put a work piece into the correct position with regard to the tool of a material working machine unless the instant device be used, this would be also the case in veneer clipping, or other material working, machines. The materials in prior devices were placed upon a stationary table and then, between this table and the knife holder, brought by hand under the knife and put into the correct position with regard to this latter. However, the cutting place of the clipping machine was not only difficult to get at, so that an exact adjusting of the material position was practically impossible, but, besides this, the adjusting was very dangerous, in that the hands of the worker manipulated below the hardly visible knife, rendering the risk of fingers or even hands being cut off very great. It was also very difficult to obtain veneer strips with parallel edges, which strips, owing to defects in the veneer sheets, must mostly be cut out of the latter in different widths.

The device according to the invention remedies these dangers and inaccuracies. It is characterised by a movable carrier for the work piece by means of which the latter is conveyed to the tool in such a way that its edges are forced to remain parallel to themselves. The work piece may be placed in varying angular positions and there are instrumentalities on the work-carirer to control the action of the tool as well as to vary the angular position of the work piece.

Figure 1:
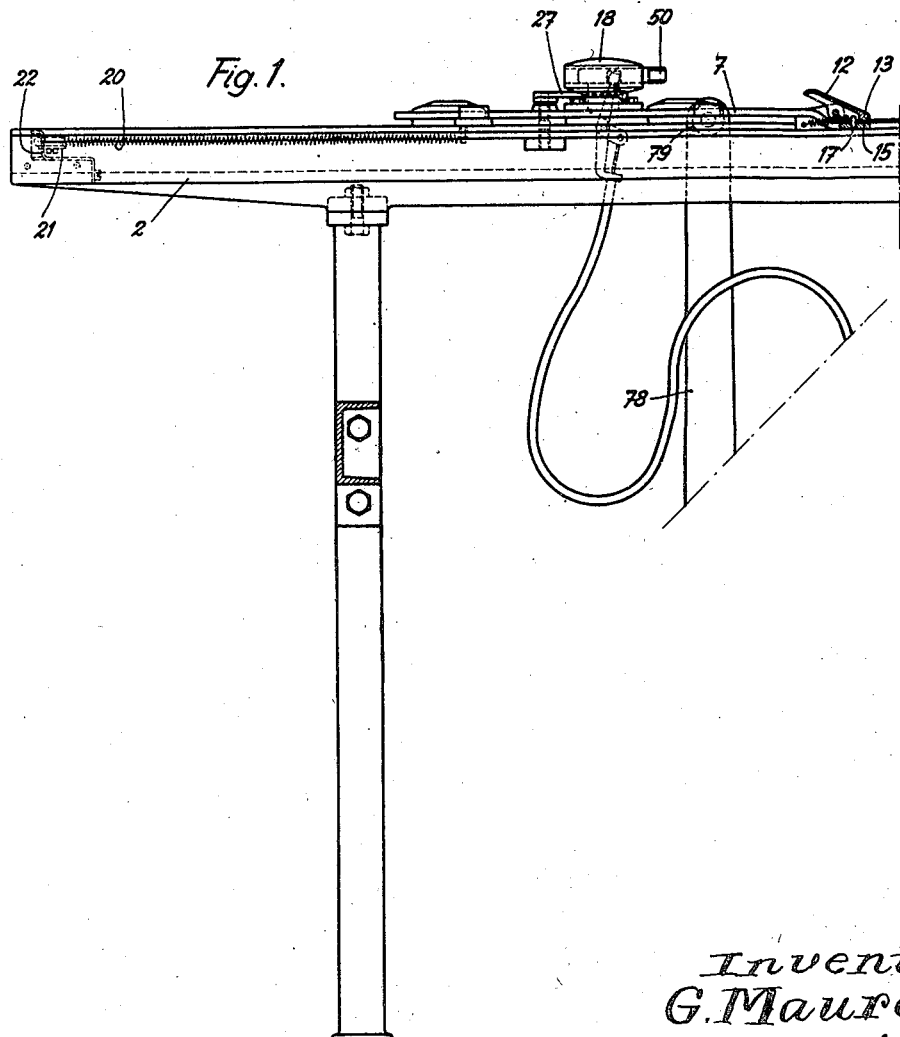
Figure 1A:
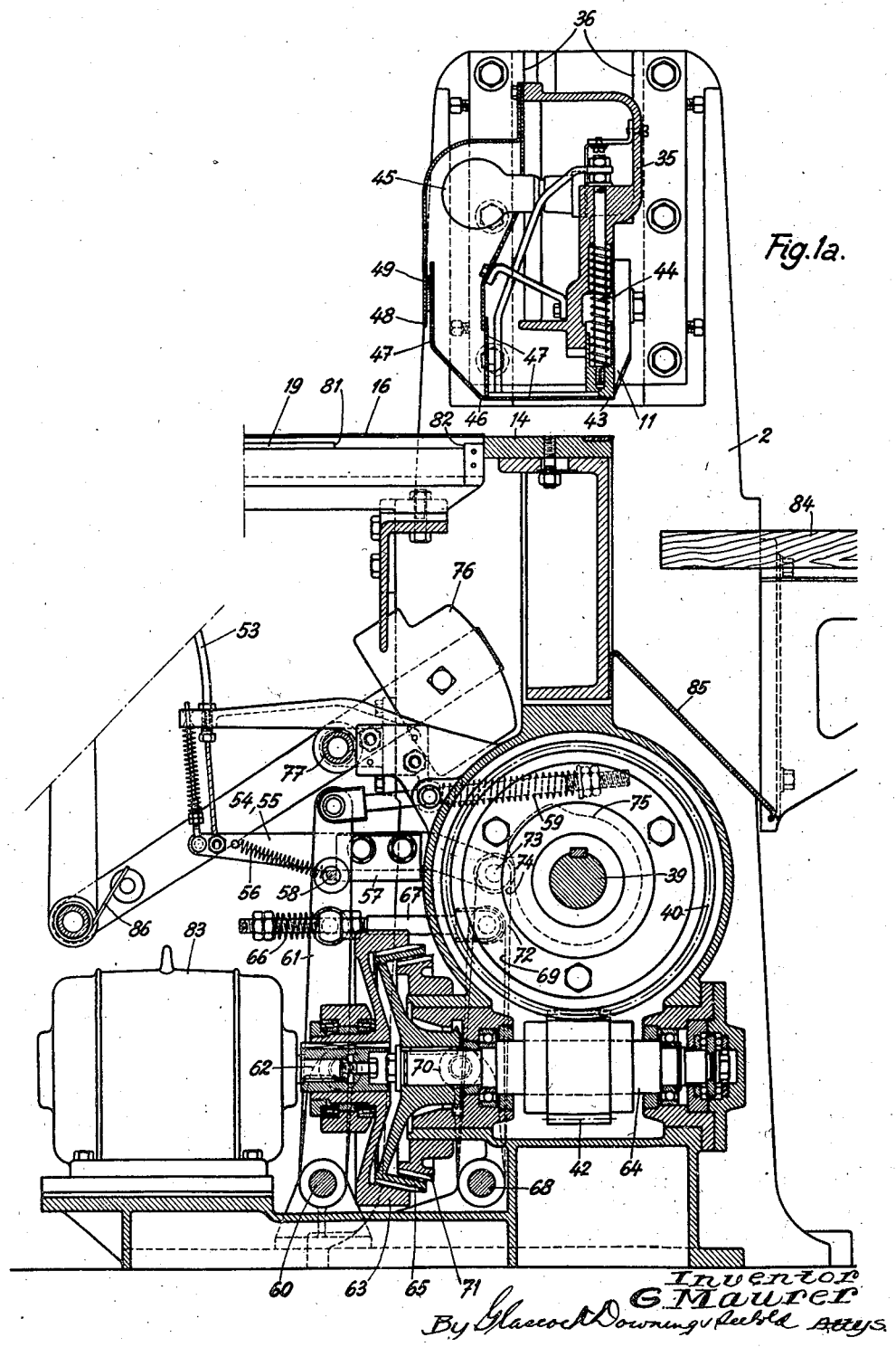

The accompanying drawings illustrate, by way of example, one embodiment of the device according to the invention which is used in a veneer clipping machine and described as follows:

Fig. 1 and Fig. 1a, taken together is a section of the device through the axis of the worm shaft.

Figure 12:
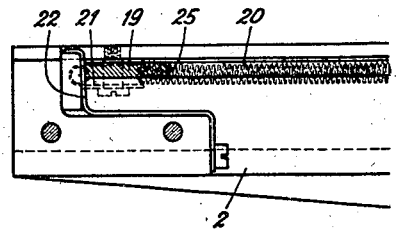
Figure 2A:
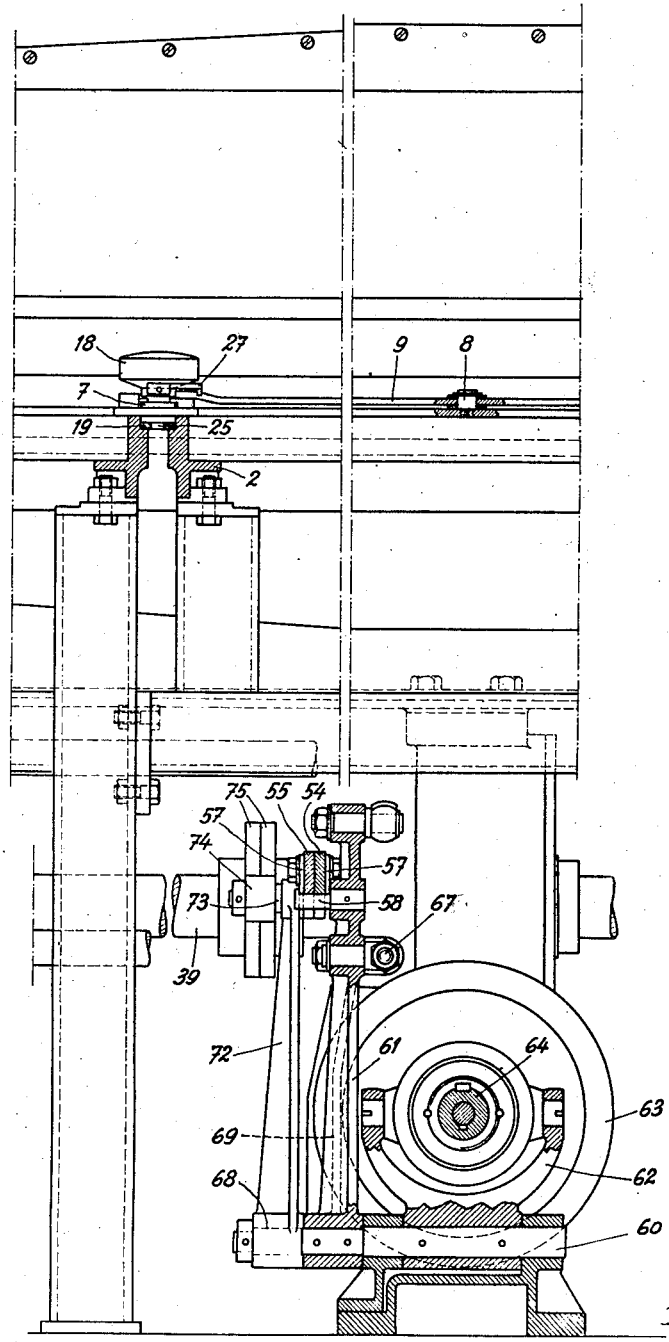
Figure 4:
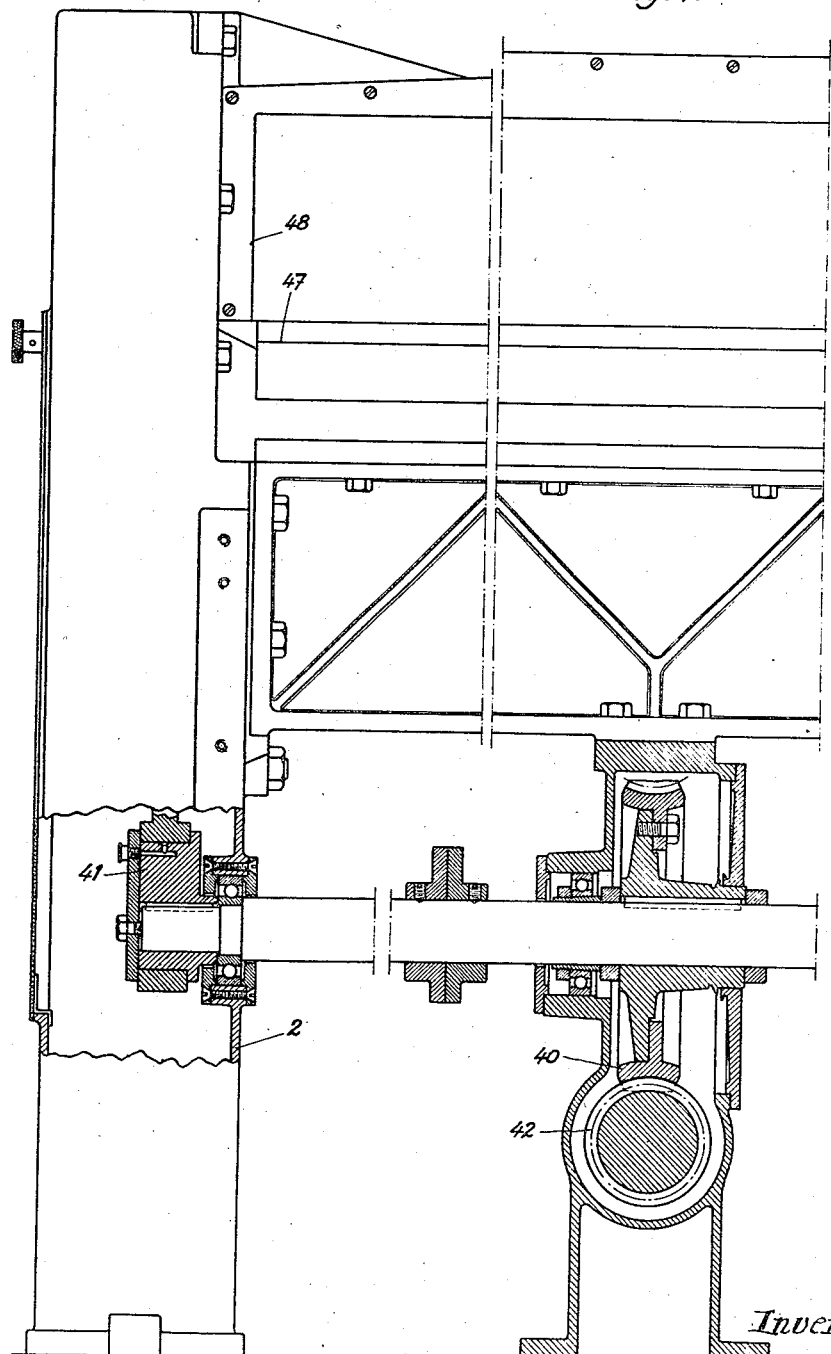
Figure 10:
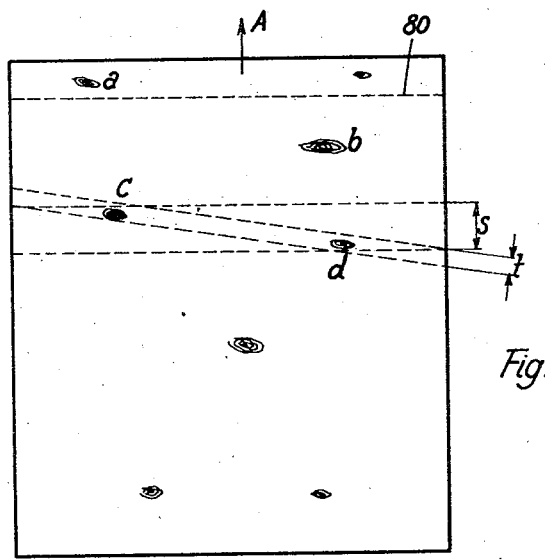
Figure 11:
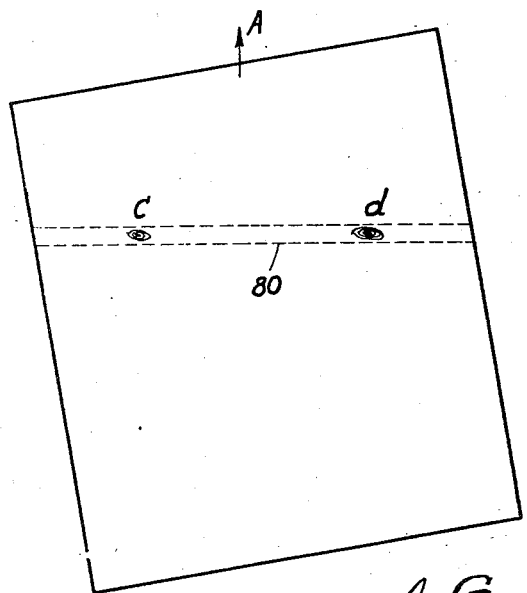

Fig. 2, plus Figs. 2a, 2b, is a view seen from the laying-on side, partly in section, Fig. 3, plus Fig. 3a, is a plan view, Figs. 4, plus Fig. 4a, and 5 show the drive of the knife holder, Fig. 6 is a plan view of the handles, on an enlarged scale, Fig. 7 is a section along the line VII—VII of Fig. 6, Fig. 8 is a detail of Fig. 6, Fig. 9 is a detail of the rail, Figs. 10 and 11 show a veneer sheet in two different positions with regard to the conveying direction, Fig. 12 illustrates a further detail of the rail.

On the raceways 1 of the frame 2 runs a carriage by means of rollers 3. The carriage has a main plate 4 to which the rollers 3 are fixed. Besides these latter, auxiliary rollers 5 are fixed to this plate 4 which are likewise supported on raceways of the frame 2. In order that the carriage might be moved as easily as possible, it is under the influence of a weight 76 whose carrier is pivotally mounted at 77 on the frame 2 and is connected with the plate 4 by means of the links 78 and the roller 79. On letting go the handles 18, the torsion spring 86 brings the carriage back into its outermost left-hand position. On the upper side of the main plate 4 the bars 7 are reciprocatingly mounted by means of the guides 6. The bars 7 are interconnected by means of the lever 9 pivoted on the main plate 4 with the aid of the pin 8. The lever 9 is connected to the bars 7 by the help of the guides 10. The action of the lever 9 is described later on. On the end turned towards the knife 11, the bars 7 are bent downwards. At these bent ends each of the two bars carries a spring-loaded lever 12 between the gripping surface 13 of which and the counter surface 15 lying level with the table area 14 the veneer sheet 16 is held in engagement with stops 17. The grip of the levers 12 on the veneer sheet is sufficiently yieldable to permit displacement of said sheet relative to the levers as will appear from the following description. Furthermore, handles 18 are screwed to the two bars allowing of moving either each bar per se in a manner described later on or together with the main plate 4 of the carriage. Beneath one of the two bars 7 and beneath the main plate 4 a rail 19 is slidably mounted on the frame 2. This rail is normally pressed against a stop surface 22 of the frame by a spring 20 being attached to it and running over a roller 21, that is, as seen in the drawings, the rail is normally held in its outermost left-hand position. For reasons stated later on, this rail 19 must be rigidly connected with the bar 7 lying above it and the plate 4. For this purpose a bolt 23 provided with left- and right-hand threads passes through a slot 24 of the plate 4 and through a slot 25 of the rail 19. This bolt carries on its lower end a lock-nut 26 and on its upper end a hand lever 27, whose free end lies within reach of one of the handles 18. Between the plate 4 and the rail 19 a disc 28 is inserted which, on turning the hand lever 27, causes a clamping together of the parts 7, 4 and 19.

Lever 27 is under the influence of a return spring 29.

Plate 4, also under the other bar 7, has a slot 24 (Fig. 8) through which the bolt 30 of another hand lever 31, whose free end lies in reach of the other handle 18, passes. However, this hand lever does not serve the purpose of clamping several parts together, but its bolt 30 carries a pawl 32 lying level with the slot 24 and normally engaging a notch 33 of the plate 4. By turning the lever 31 against the effect of the return spring 34 the pawl 32 can be disengaged from the notch 33 for a purpose described later on.

Over the fore end of the table area 14 lies the knife holder 35 to which the knife 11 is fixed. This knife holder is mounted by means of the guides 36 on the frame 2 to move up- and downwards. It is driven by means of the connecting rods 38 fixed to it by the bolts 37 and moved by the eccentric discs 41 mounted on the shaft 39 of the worm wheel 40. The latter cooperates with the worm 42 engageable and disengageable in a manner described later on.

The press bar 43 pressing, before cutting, the veneer sheet 16 against the table area 14, is resiliently mounted on the knife holder 35 by means of the spring 44.

A light source 45 is placed in the interior of the knife holder 35, whose rays passing through a slit 46, Figures 1a and 2, produce a line of light upon the veneer sheet 16. The line is parallel to the cutting direction of the knife 11. The slit 46 is provided on the covering 47 fixed to the press bar 43. In order to prevent any light from passing anywhere but through the slit 46, a second covering 48 is fixed to the knife holder. This covering is made light proof with regard to the covering 47 of the press bar 43 by the intermediate layer of felt 49.

It is desirable to control the clipping knife 11 at will by means of the handles 18 and that, for the sake of security, only when the worker has both hands on the handles 18, in order to avoid one of his hands being injured. The following control device serves this purpose:

On each of the two handles 18 a push member 50 is movably mounted and cooperates with a rocking lever 52 pivotally fixed to the projection 51 of the handle 18, the one end of a suitable pull member, e. g. of a Bowden cable 53 attaching said rocking lever. The Bowden cable of one handle 18 leads to a lever 54 and the Bowden cable of the other handle 18 to a lever 55 lying behind lever 54. Each of these two levers, being under the influence of return springs 56, carries a stop plate 57 cooperating with two cams 58 of the lever 61 rotatably mounted on the axle 60 and being under the influence of the pressure spring 59. Rigidly connected with the lever 61 is the forked lever 62 serving the purpose of bringing the coupling half 63 into and out of contact with the coupling half 65 keyed on the shaft 64 of the worm 42.

A lever 69 mounted on the axle 68 is connected with the lever 61 by a rod 67 being under the influence of the spring 66, this lever 69 being rigidly connected with the forked lever 70. The latter engages the brake cone 71 and serves the purpose of bringing this cone into and out of contact with the braking surface of the coupling half 65. On the axle 68 the guide lever 72 is loosely mounted and is connected with the levers 54 and 55 by means of the bolt 73. Besides this, the bolt carries a roller 74 cooperating with the two-part cam disc 75. As shown later on, the latter serves the purpose of automatically stopping or braking the knife drive, as soon as the clipping machine has carried out a full cycle. The reason why the disc 75 consists of two single parts, which are rotatable with regard to each other, will be shown later on.

Operation

The veneer sheet 16, the defects of which should be cut out, is moved below the levers 12 after having opened these latter, and is clamped fast by the same when they have been let go. The light source 45 is switched on and the rays penetrating through the slit 46 produce a lighting line on the veneer sheet. Be it supposed that the veneer sheet, of which also a plan view is shown in Figs. 10 and 11 of the drawings, has a number of defects a, b, c, d, etc., in the form of knots, cracks and the like. These defects should be cut out with the smallest loss possible. Now the worker takes hold of the two handles 18 without previously pressing upon the push member 50 or upon the hand levers 27. Then he moves the carriage and with it the veneer sheet 16 forward towards the knife. As soon as the lighting line 80 lies immediately behind the foremost defect a, the worker stops the carriage and presses with the thumb of his left hand upon the hand lever 27. In this way, as shown above, the one bar 7 and with it the whole carriage is clamped fast to the rail 19. Up till now, this rail was in its outermost left-hand position. It is of such a length that its right-hand front face 81, in this outermost left-hand position, has a distance from the stop surface 82 of the frame which is exactly equal to the distance between the lighting line 80 and the cutting edge of the clipping knife 11. The worker, after having carried out the above clamping, moves the carriage on towards the knife until the front face 81 strikes against the stop surface 82. Now the cutting edge of the knife 11 is in exactly the same position with regard to the defect a as was the lighting line 80 before, since the carriage could only be moved forward by the distance from the lighting line to the cutting edge. Now the veneer sheet can be cut immediately behind the defect a and that exactly parallel to the lighting line 80. Therefore, when adjusting the defect with regard to the easily visible and easily and safely accessible lighting line, one knows in advance what course the cut takes.

Now the worker puts the clipping machine into operation by pressing and subsequently letting go the push members 50. This, however, is only possible when he presses upon both push members, i. e., when both his hands are upon the handles 18. Then the two Bowden cables 53 rotate the levers 54 and 55 so that the stop plates 57 fixed to these latter are brought out of engagement with the cams fixed to the levers 61. The lever 61 and, with it, the forked lever 62 and, by means of the rod 67, also the lever 69 and the forked lever 70 are rotated in the clockwise direction by the spring 59. In this way the brake cone 71 is lifted off from the coupling half 65 and the coupling half 63 is brought into contact with the coupling half 65. Now the worm 42 and, with it, the knife 11 is driven by the motor 83. Shortly before the cutting edge of the knife 11 reaches the veneer sheet, the press bar 43 is applied against the latter and gives way, thereby compressing the spring 44 and pressing the veneer sheet against the table area 14. On further downward movement of the knife holder 35 the cutting edge of the knife 11 reaches the sheet 16 and cuts it through behind the defect a. The waste wood cut away falls through between the clipping machine and the receiving table 84 for the defectless veneer strips upon a guide plate 85. At one forward and backward stroke of the knife 11 the shaft 39 and, with it, the cam disc 75 makes one revolution. At the end of this latter the cam of the disc 75 is in reach of the roller 74. The drawings show a position immediately before, and when the cam moves slightly forward, it displaces the roller 74 and with it the two levers 54, 55 to the left. During this left-hand movement the stop plates 57 strike against the cams 58 of the lever 61 and then move the latter, the forked lever 62, the lever 69 and the forked lever 70 in the anticlockwise direction, which causes a disengaging of the coupling and a braking of the worm shaft. The clipping machine is automatically stopped until there is a new manipulation of the push members 50.

Should the worker manipulate only one of the two push members 50, either lever 54 or lever 55 only would be rotated, i. e. only way would be given to one of the two cams 58 of the lever 61. Lever 61 might thus not be rotated by the spring 59 and the engaging of the clipping machine would not be possible. Therefore, the worker is obliged to have both hands applied to the handles 18, so that his fingers cannot be under the knife beam or even within cutting reach of the knife.

Providing two handles 18 has still another advantage: The position of the defects c and d, e. g., is such that a strip of the width s should be cut out, if one cut perpendicularly to the longitudinal axis of the veneer sheet 16. However, if one succeeds in making inclined cuts, the scrap has only the width t. Indeed, with the help of the second handle 18 one succeeds in turning the veneer sheet 16 yieldably held by the levers 12 with regard to the travelling direction of the carriage indicated by arrow A, so that the lighting line 80 not only lies immediately behind the defect d but also immediately behind the defect c. In order to obtain this, the worker with his right thumb presses upon the lever 31, so that the pawl 32 comes out of engagement with the notch 33. Now the bars 7 in their longitudinal direction can be displaced with regard to the plate 4 by means of the handles 18. If the worker moves the right-hand bar 7 forward, the left-hand bar 7, owing to the connection of the two bars 7 by means of the lever 9, moves backward, so that the veneer sheet axis is turned out of the direction A. The handles 18 are acted upon until the lighting line 80 lies immediately behind the two defects c and d, then, with his left thumb, the worker presses upon the lever 27 and moves the carriage forward until the surface 81 strikes against the surface 82. All other steps are repeated as before.

The adjusting device illustrated can be used not only for clipping machines, but also for other wood working machines, e. g. for a circular saw advancing across the feed direction of the carriage. The adjusting mark must not in every case be formed by a lighting line, other suitable means such as rollers or strings might be used. The Bowden cables might be replaced by an electric, hydraulical or pneumatic distance control.

Not only single veneers but also bundles of veneers can be cut with this machine. When cutting bundles it is often desired, to apply glue subsequent to cutting. This should be done as long as the bundle is held by the press bar 43. For this purpose the two cam discs 75 are rotated with regard to each other in such a way that the notches no longer lie one behind the other and that in such a way that the clipping machine is only stopped when the cutting edge of the knife has reached beyond the top edge of the veneer bundle but when the bar 43 still holds the bundle. Then glue is applied. Then the clipping machine is again engaged by means of the push members 50. The second cam only disengages the clipping machine, when the bar 43 is lifted off and is in its upper rest position.

With the device shown strips with parallel edges can be cut away from the veneer sheet. The workpiece can even be clamped fast in a position non-parallel with regard to the cutting edge of the knife, the strips cut away can nevertheless have parallel edges.

What I claim is:

1. In a machine of the character described, a frame, a tool, and an adjusting device comprising, an adjusting means for adjusting a work piece with regard to said tool, a movable carrier adapted to convey a work piece to said tool in such a way that its edges are forced to remain parallel to themselves and, together with the work piece, to be adjusted with regard to said tool by said adjusting means, a member adapted to be rigidly connected with said carrier, and a stop adapted to cooperate with said member for automatically stopping said carrier in the position of the work piece required for being worked upon.

2. In a machine of the character described, a frame, a tool, and an adjusting device comprising, an adjusting means for adjusting a work piece with regard to said tool, a movable carrier adapted to convey a work piece to said tool in such a way that its edges are forced to remain parallel to themselves and, together with the work piece, to be adjusted with regard to said tool by said adjusting means, a member adapted to be rigidly connected with said carrier, and a stop adapted to cooperate with said member for automatically stopping said carrier when the path run through by said member is equal to the distance between said adjusting means and the cutting plane of said tool.

3. In a machine of the character described, a frame, a tool, and an adjusting device comprising, a light source adapted to produce a lighting line for adjusting a work piece with regard to said tool, a movable carrier adapted to convey a work piece to said tool in such a way that its edges are forced to remain parallel to themselves and, together with the work piece, to be adjusted with regard to said tool by said lighting line, a member adapted to be rigidly connected with said carrier, and a stop adapted to cooperate with said member for automatically stopping said carrier when the path run through by said member is equal to the distance between said lighting line and the cutting plane of said tool.

4. In a machine of the character described, a frame, a tool, and an adjusting device comprising, an adjusting means for adjusting a work piece with regard to said tool, a movable carrier adapted to convey a work piece to said tool in such a way that its edges are forced to remain parallel to themselves and, together with the work piece, to be adjusted with regard to said tool by said adjusting means, two handles attached to said carrier for moving the lattter, a member adapted to be rigidly connected with said carrier, and a stop adapted to cooperate with said member for automatically stopping said carrier in the position of the work piece required for being worked upon.

5. In a machine of the character described, a frame, a tool, and an adjusting device comprising, an adjusting means for adjusting a work piece with regard to said tool, a movable carrier adapted to convey a work piece to said tool in such a way that its edges are forced to remain parallel to themselves and, together with the work piece, to be adjusted with regard to said tool by said adjusting means, said carrier including a plate, bars for carrying the work piece, displaceably arranged on said plate, two handles on said bars for moving the latter, a rotation organ interconnecting said bars, and coupling means for rigidly fixing said bars to said plate, a member adapted to be rigidly connected with said carrier, and a stop adapted to cooperate with said member for automatically stopping said carrier in the position of the work piece required for being worked upon.

6. In a machine of the character described, a frame, a tool, and an adjusting device comprising, an adjusting means for adjusting a work piece with regard to said tool, a movable carrier adapted to convey a work piece to said tool in such a way that its edges are forced to remain parallel to themselves and, together with the work piece, to be adjusted with regard to said tool by said adjusting means, said carrier including a plate, bars for carrying the work piece, displaceably arranged on said plate, clamping means on said bars for fixing the work piece, two handles on said bars for moving the latter, a rotation organ interconnecting said bars, coupling means for rigidly fixing said bars to said plate, a first lever in reach of one of said handles, adapted to engage and to disengage said coupling means, a member, a second lever in reach of the other of said handles, adapted rigidly to connect said member with said carrier, and a stop adapted to cooperate with said member for automatically stopping said carrier in the position of the work piece required for being worked upon.

7. In a machine of the character described, a frame, a tool, a disengageable drive for said tool, and an adjusting device comprising, an adjusting means for adjusting a work piece with regard to said tool, a movable carrier adapted to convey a work piece to said tool in such a way that its edges are forced to remain parallel to themselves and, together with the work piece, to be adjusted with regard to said tool by said adjusting means, two handles attached to said carrier for moving the latter, control elements for controlling said disengageable drive, mounted on both said handles and disposed in such a way that engagement of said disengageable drive is only possible by simultaneously manipulating the control elements on both handles, a member adapted to be rigidly connected with said carrier, and a stop adapted to cooperate with said member for automatically stopping said carrier in the position of the work piece required for being worked upon.

8. In a machine of the character described, a frame, a tool, a drive for said tool, a coupling for engaging and disengaging said drive, a controller for controlling said coupling, including two stop members, and an adjusting device comprising, an adjusting means for adjusting a work piece with regard to said tool, a movable carrier adapted to convey a work piece to said tool in such a way that its edges are forced to remain parallel to themselves and, together with the work piece, to be adjusted with regard to said tool by said adjusting means, two handles attached to said carrier for moving the latter, distance control means, control elements adapted to operate said stop members with the aid of said distance control means and mounted on both said handles, said controller being constructed in such a way that engagement of said coupling is only possible by simultaneously manipulating the control elements on both handles, a member adapted to be rigidly connected with said carrier, and a stop adapted to cooperate with said member for automatically stopping said carrier in the position of the work piece required for being worked upon.

9. In a machine of the character described according to claim 8, means adapted to bring said controller at the end of a cycle of said tool automatically in disengaging position, thus stopping the tool.

10. In a machine of the character described according to claim 8, means adapted to bring said controller at the end of a cycle of said tool automatically in disengaging position, thus stopping the tool, a press bar adapted to press upon the work piece, said means comprising two cams adjustable with regard to each other in such a way that, on the backward stroke of said tool, said press bar can be stopped while still pressing upon the work piece.

11. In a machine of the character described, a cutter, a carriage member movable with respect to said cutter, work piece gripper members movable with the carriage to operatively position the work piece with respect to the cutter and movable relatively to each other on the carriage for varying the angular position of the work piece with respect to said cutter, and handles carried by portions of certain of said members remote from said cutter for facilitating movement of said carriage member and for relatively adjusting said gripper members.

12. In a machine of the character described, a cutter, a carriage member movable with respect to said cutter, work piece gripper members movable with the carriage to operatively position the work piece with respect to the cutter and movable relatively to each other on the carriage for varying the angular position of the work piece with respect to said cutter, and handles carried by portions of certain of said members remote from said cutter for facilitating movement of said carriage member and for relatively adjusting said gripper members, and a stopping device rendered effective in dependence upon manipulation of one of said handles for stopping the movement of said carriage member.

GOTTFRIED MAURER.